United States Patent
Chandross et al.

[11] Patent Number: 6,160,645
[45] Date of Patent: Dec. 12, 2000

[54] HOLOGRAPHIC MEDIA

[75] Inventors: Edwin Arthur Chandross, Murray Hill; Venkataram Reddy Raju, New Providence; Marcia Lea Schilling, Basking Ridge, all of N.J.; Jeffrey Linn Bream, Bethlehem, Pa.

[73] Assignee: Lucent Technologies Inc., Murray Hill, N.J.

[21] Appl. No.: 09/427,421

[22] Filed: Oct. 26, 1999

[51] Int. Cl.[7] .............................. G03H 1/02; G03H 1/00; G03H 1/04; B32B 17/00

[52] U.S. Cl. ........................ 359/3; 359/1; 430/1; 430/2; 156/107

[58] Field of Search ........................... 359/1, 2, 3; 430/1, 430/2; 156/107

[56] References Cited

U.S. PATENT DOCUMENTS 5,095,375  3/1992  Bolt ............................................. 359/1

*Primary Examiner*—Audrey Chang
*Attorney, Agent, or Firm*—Thomas, Kayden, Horstemeyer & Risley LLP

[57] ABSTRACT

A holographic medium uses a photosensitive polymer medium. The shelf life of the photosensitive polymer medium is improved by hermetically sealing the polymer between glass plates. The hermetic seal is designed so that high $T_g$ materials, or solder, can be used as the sealant without damage to the polymer already contained between the plates. The hermetic seal comprises metal foils attached to the plates with the edges thereof extending away from the plates in tab-like fashion. The foils are attached prior to filling the assembly with polymer. After filling, the outer edges of the foil tabs are the sealed with local heating away from the site of the polymer, or crimped using mechanical crimping.

28 Claims, 2 Drawing Sheets

HOLOGRAPHIC MEDIA

FIELD OF THE INVENTION

This invention relates to techniques for packaging holographic media to improve performance and shelf life.

BACKGROUND OF THE INVENTION

A promising new field for information storage uses optical data stored in the form of holograms. Holograms are three dimensional images that can be used to store large amounts of digital data. Holographic storage systems under development are capable of storage densities of tens or hundreds of data bits per $\mu m^2$.

Lithium niobate has been studied extensively as an optical storage medium and offers the advantage that data can be written read, erased, and re-written. However, inorganic crystal materials such as lithium niobate are not ideal for creating large data banks. Moreover, this medium tends to be volatile, i.e. the data degrades upon reading. Methods have been developed for making these materials non-volatile, but they require heating the storage medium, or a very high writing flux, either of which limits the usefulness of the material.

More promising, for read-only storage applications, are polymer matrix materials containing monomers and photo-initiators. Irradiation results in polymerization that induces local changes in the refractive index of the polymer body. This approach allows the use of independent chemistries for the matrix material and for the photosensitive material. The matrix can be designed independently for mechanical and thermal stability, and shelf life.

A promising candidate for a high density optical storage medium is Mercapto-Epoxy-Bromo-Styrene (MEBS). See U.S. patent application Ser. No. 09/046822, which is incorporated herein by reference. However, studies have shown that this material, while highly effective as an optical storage medium, has useful but limited shelf life in an uncontrolled, e.g. humid, environment. This polymer, not unlike polymers in general, has a tendency to absorb moisture during storage, which causes the material to swell and undergo refractive index changes in a spatially non-uniform fashion. Since the material is typically placed between glass plates, the non-uniform swelling and/or refractive index change in the polymer diminishes the optical quality of the storage medium. Other polymer materials that may be useful for optical storage are also sensitive to atmospheric conditions that limit shelf life. Accordingly, if these polymer storage media are to be effective for these applications, techniques for improving their shelf life need to be developed.

STATEMENT OF THE INVENTION

We have developed techniques for improving the shelf life of polymer holographic storage media. The prepolymer materials, typically 50–2000 $\mu m$ in thickness, are coated onto a base glass plate and encapsulated with a counter glass plate. The prepolymer is then polymerized in situ, in an optically flat configuration, to form the matrix of the recording medium. This can be either thermally or photochemically initiated. Prior to encapsulation and polymerization, each glass plate is provided with a flexible edge tab that extends around the periphery of the plate, and is sealed to it. The prepolymer is dispensed between the glass plates. The tabs are sealed together with a suitable adhesive or bonding material, or alternatively are mechanically crimped together, to produce a moisture proof package. This approach not only retards moisture intrusion into the polymer, but also prevents distortion of the glass substrate caused by stresses due to differential thermal expansion of the polymer and sealant during temperature excursions in the use environment. An important advantage of this technique is that it allows the use of relatively high temperatures, i.e. temperatures that are potentially harmful to the polymer medium, both for attaching the tab to the glass plates, and sealing the tabs together. This sealing technique also accommodates the shrinkage induced by polymerization of the matrix material.

DETAILED DESCRIPTION

Figure 1:
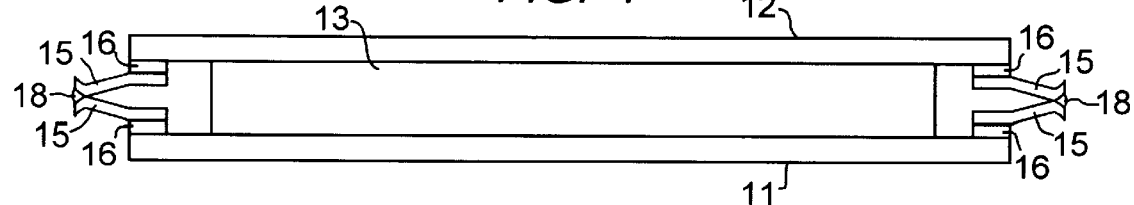
FIG. 1 is a schematic representation of a polymer optical storage medium of the invention.

Optical quality is an important parameter in assessing the suitability of holographic media to record and read out data. Since the recording medium is one of the components in a multi-component optical path through which high capacity data pages are imaged and large numbers of holograms are read with high fidelity, it is important that the samples be optically flat over a large area ($\lambda/4$/cm, where $\lambda$ is the wavelength of the recording laser, e.g. 532 nm). Optical quality may be characterized using a ZYGO GPI $XP_{HR}$ interferometer. The ratio of the Strehl (a point spread function) to the root-mean-square waves over a 4 cm diameter area in the center of the sample is defined as Q. An optical quality of Q>1 is considered acceptable for digital holographic recording. Samples, freshly prepared from the mercapto-epoxy-bromostyrene (MEBS) formulation, typically have high Q values (>2). These samples are prepared in an apparatus that allows adjustment of the optical flatness of the external plates during the matrix cure. See e.g. U.S. Pat. No. 5,932,045. As the MEBS samples age under uncontrolled ambient conditions, the optical quality deteriorates. Significant reduction is observed one day after sample preparation and after ~ 2 weeks the Q value is down (from an average Q=5–6) to zero. The distortion in the MEBS samples is observed in the interferometer as concentric circles moving in from the edges of the sample towards the center. Initially this distortion is outside of the region where Q is typically measured. As aging continues, this edge distortion extends into the center region of the sample, indicating variations in thickness and refractive index across the sample.

Based on the known moisture sensitivity of some of the matrix components, the effect of humidity on the aging of MEBS samples was determined. Freshly prepared samples were stored in three different controlled humidity environments and the optical quality (Q) was monitored with time. After 2 weeks at 95% relative humidity (RH), the optical quality had completely degraded, and at 53% RH (closest to typical ambient conditions), the Q value was 74% lower. By comparison, for the sample aged at 0–4% RH, the Q value was down 28%. This demonstration establishes that humidity control is a major factor in maintaining the optical quality of polymer holographic storage media.

To overcome the moisture problem with polymer holographic storage media, according to the invention, the polymer materials are packaged in sealed glass plates. To be effective, the sealant must be impermeable to moisture. This requirement limits the choice of sealants. Conventional polymer sealants, those that cure at relatively low temperatures, e.g. room temperature, are typically moisture permeable to a degree unacceptable for this application. The preferred sealants are those that are applied or cured at relatively high temperatures, e.g. solders. However, use of these temperatures in the packaging operation risks damage to the polymer recording medium. Crosslinking in most polymer materials is accelerated by heat. Application of heat to seal the edge around the polymer storage medium may cause non-uniform crosslinking of the polymer, and produce the same stresses and local refractive index variations that are caused by moisture.

Whereas glass plates are described herein as the preferred encapsulating means, it will occur to those skilled in the art that high quality, i.e. non-birefringent, plastic plates may also be used.

The method of the invention allows use of heat sealable materials, but avoids the adverse effects resulting from localized heating of the polymer. In this method, a flexible metal foil is attached to the periphery of the glass plates, along the inside edge. This is done prior to applying the polymer material to the glass plates so that the choice of adhesives is not limited by the thermal sensitivity of the polymer. The preferred adhesives for this application are those with a relatively high glass transition temperature, i.e. $T_g > 100°$ C.

The glass plates used to encapsulate the polymer storage medium may be quadrilateral shaped, either square or rectangular, or may be disc shaped. The metal foils used for the edge seals are in the shape of a picture frame, or in the case of disc shaped media, in a circular configuration, to form a continuous edge seal while allowing for a transparent field in the center.

With reference to FIG. 1, glass plates 11 and 12 are shown with polymer holographic storage medium 13 therebetween.

The glass plates 11 and 12 are provided with edge tabs 15, which are attached to the glass plates with adhesive 16. The edge tabs 15 are preferably metal foil. The metal foil is applied around the entire periphery of each of the glass plates 11 and 12. The foil is attached to the plates using a continuous edge bead of adhesive, shown at 16 in FIG. 1. After filling the space between the glass plates with polymer holographic medium 13, the foils are bent together as shown, and sealed with an adhesive 18. Special solders can be used to attach the metal foil to the glass. As is known, this usually requires evaporative metallization of the glass first with a material that adheres well to the glass.

Figure 2:
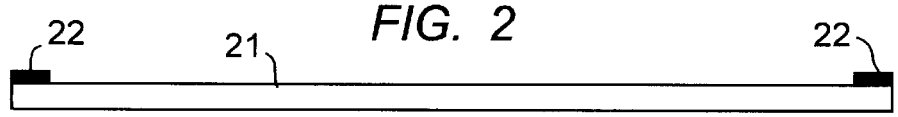
FIGS. 2–7 represent steps in a method for making the storage medium of FIG. 1.

An example of the method for making the hermetically sealed polymer holographic medium will be described in conjunction with FIGS. 2–7, which represent steps in the method. With reference to FIG. 2, a single optical glass plate 21 is shown with adhesive edge bead 22. The glass plates used to encapsulate the polymer holographic storage medium according to the invention are mounted in the apparatus described earlier, which controls the thickness of the medium preferably to 50–2000 μm. A suitable thickness for the plates is 0.5 to 2.0 mm. The glass materials are conventional. As an example, liquid crystal display glass, available from Corning, is suitable for use with the invention. Alternatively, transparent plastic plates may be used.

Figure 3:
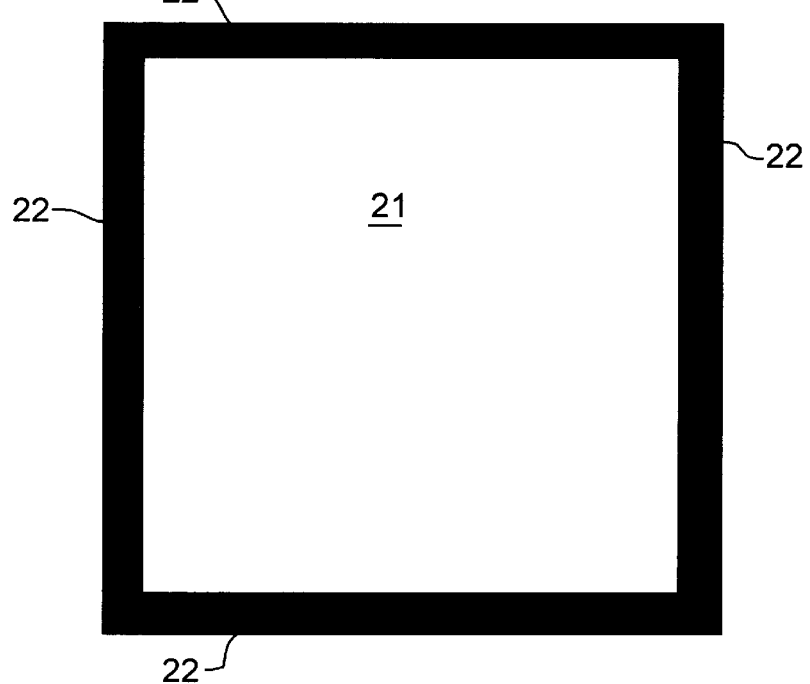

The glass plates are shown in this description as square, as in FIG. 3, but any shape, e.g. quadrilateral or disc, may be used. The continuous bead of adhesive, and the "picture frame" shape, are evident in the plan view of FIG. 3. A "picture-frame" shape is defined as an enclosing border, although the term "picture-frame" is used herein, and in the appended claims, as the most descriptive term. The adhesive 22 may be an epoxy, preferably with a glass transition temperature greater than 100° C. An examples of suitable epoxy material is the diglycidyl ether of bisphenol A crosslinked with an imidazole compound. These materials are well known and commercially available. The epoxy materials are thermally cured by heating the plate and the epoxy bead to a temperature preferably above 125° C. The use of a relatively high temperature cure increases the effectiveness of the sealant. Heating can be effected using a conventional hot plate or furnace. A rapid thermal annealing apparatus or a laser heating apparatus can be used in a manufacturing environment for higher throughput. It is advantageous to maintain a continuous adhesive bead, approximately 3–5 mm wide and 50–100 μm thick, around the periphery. Generally this is accomplished by the application of pressure during cure.

Alternatively, a conventional solder can be used as the adhesive for bonding the peripheral tabs to suitably metallized glass plates. Useful solder materials are given in the following Table.

TABLE I

| composition | Sn | Pb | Bi | solidus ° C. | liquidus ° C. |
|---|---|---|---|---|---|
| I | 63 | 37 |  | 183 | 183 |
| II | 42 |  | 58 | 138 | 138 |
| III | 43 | 43 | 14 | 143 | 163 |

| composition | Sn | Pb | Ag | Sb | solidus ° C. | liquidus ° C. |
|---|---|---|---|---|---|---|
| IV | 95 |  |  | 5 | 235 | 240 |
| V | 96.5 |  | 3.5 |  | 221 | 221 |
| VI | 10 | 90 |  |  | 275 | 302 |

Figure 4:
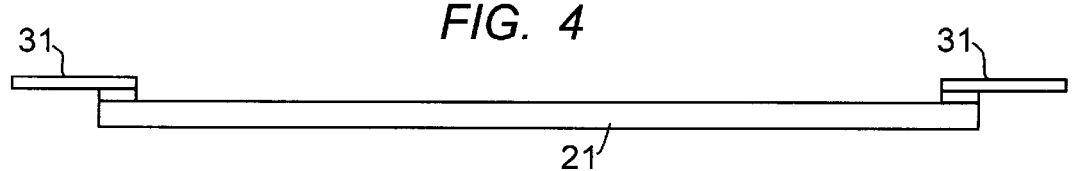
Figure 5:
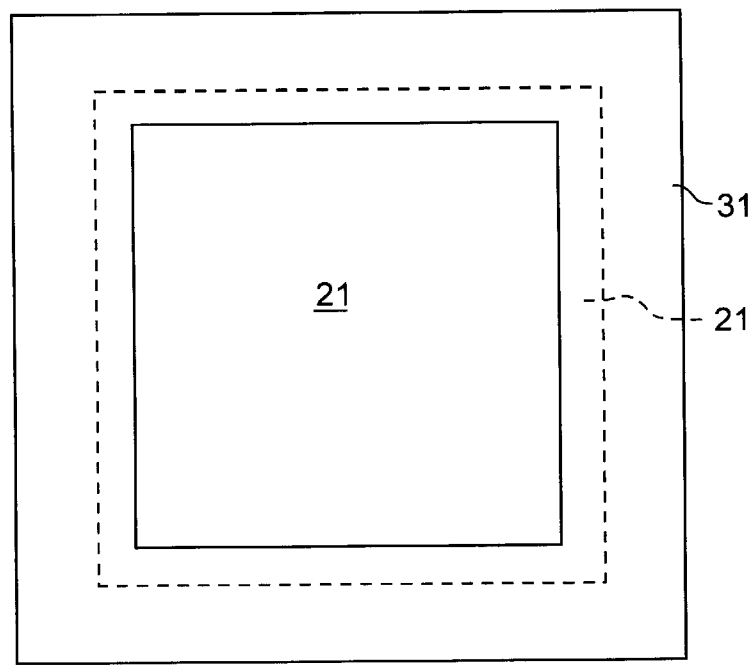
Figure 6:
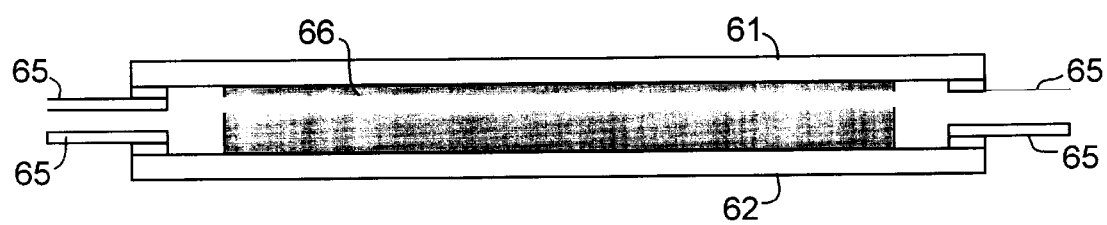

With reference to FIG. 4, the sealing tab 31 is then joined to the periphery of the glass plate 21 following the prescribed application instructions of the adhesive supplier. The tab 31 is preferably a metal foil, such as a copper foil. Other water impermeable materials may also be used. The tab material in most cases will be opaque so, as seen in FIG. 5, the sealing foil 31 is made in the shape of a picture-frame to allow optical access to the polymer storage medium. The tab 31 extends from the edge of the glass plate 21 by a distance that conveniently allows the tabs on mating plates to be folded together and sealed, as will be explained below. As an example, the tab extends from the edge of the plate by a distance in the range 0.5–20 mm.

The foil should be thin enough to bend or fold with relative ease. For copper or aluminum foil, a thickness in the range 10–50 μm is suitable. Other foil materials such as Ta, Ti, Au, Pt, Ag etc. can also be used. If solder is used as the adhesive, the solder is reflowed in a conventional fashion to effect a continuous seal between the metal foil 31 and the glass plate 21. In the case of solder as the adhesive, the metal foil is preferably copper.

Two glass plates 61 and 62, with edge tabs 65 prepared as just described, are placed in an apparatus which allows adjustment of the optical flatness of the sample during matrix cure as described in U.S. patent application Ser. No. 08/867,563, (incorporated herein by reference). The plates are installed in the apparatus and are made compliant to external optical flats using a vacuum. A prepolymer of the desired formulation is applied to plate 62 using a syringe or other applicator. The distance between the inner surface of plates 61 and 62 is then adjusted by the apparatus to the desired prepolymer thickness. After an initial alignment of the apparatus to parallel the outer surfaces of plates 61 and 62 with respect to each other, the prepolymer material is cured to form a polymer matrix which contains the writing monomer and photoinitiator. Periodic adjustments of the external surface optical parallelism is made during the curing process until the viscosity of the matrix is sufficient to maintain the adjustment. The space between the glass plates may be in the range 50–2000 µm. Individual spacers arranged around the periphery of the assembly, or a continuous spacer, can be used if desired but mechanical spacers are usually not necessary using the techniques described. A variety of approaches can be used to fill the gap between the plates. Depending on the viscosity of the prepolymer it can be applied to one or both plates prior to aligning them together. It is preferably applied after the plates are aligned and clamped together.

The photosensitive polymer material may be selected from a wide variety of choices known in the art, as well as new materials to be developed for these applications. A suitable choice is mercapto-epoxy-bromostyrene (MEBS) as mentioned earlier. The photoinitiator may also be selected from a variety of known materials. A suitable choice is bis (η.5-2,4-cyclopentadien-1-yl)bis{2,6-difluoro-3-(1H-pyrrollyl)phenyl}titanium(Irgagcure-784, Structure 1), available from Ciba Specialty Chemicals. The prepolymer is then cured by heating. For MEBS, standing at room temperature for 60–120 minutes is adequate for cure.

Figure 7:
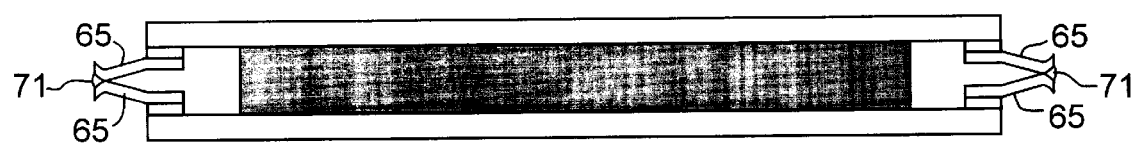

As shown in FIG. 7, the tabs 65 are bent or folded together, or mechanically crimped, to form a continuous seam. The seam is sealed by adhesive 71. The adhesive and the sealing technique may the same as that used to affix the foil tabs to the plates. The preferred technique is to solder the tabs together to form a continuous hermetic seal. Alternatively, resistance welding or mechanical crimping, can be used to form the seal. These techniques are collectively characterized as joining the metal foil tabs with a hermetic seal. The metal foil tabs, joined hermetically to the glass plates, forms the basic seal for the edge of the assembly. The technique for joining the folded metal tabs is relatively undemanding. The tabs are shown in the figures as butting together for joining. The tabs can also be folded one over the other, and joined.

It will be recognized by those skilled in the art that the arrangement shown in FIG. 7, where the seam for final sealing of the assembly is offset from the polymer storage material, allows the use of heat to seal the seam without damage to the polymer material. It will also be recognized that the metal foil tabs are sufficiently compliant so that the outer edges of the foil tabs can be bent or folded together. This compliance also serves to reduce stresses in the assembly due to relative movement of one plate with respect to the other. Stress can occur as the result of handling, or due to thermal expansion effects. The metal foil accommodates the mechanical strain so that the sealant itself is not mechanically stressed.

It may be advantageous to use an anti-reflection coating on the exterior surfaces of the plates.

The shelf-life of a holographic medium, before writing, is determined by the resistance of the seal to moisture permeation. The effectiveness of the seal is determined by monitoring the optical quality or Q of the sealed samples as a function of time using an interferometer. A commercial instrument manufactured by Zygo was used. Freshly prepared samples are typically optically flat over the entire area covered by the polymer film. If the seal provides a good moisture barrier, there will be no optical distortion at the edges of the sample over time. Moisture permeation is evident as a change in the refractive index and/or the optical path length in the interferometer.

The holographic performance of polymer recording media produced in accordance with the methods described above was evaluated by recording multiple holograms in the materials. The output from a diode-pumped, frequency doubled Nd:YAG laser (Coherent DPSS-532-400) was spatially filtered and collimated to yield a plane-wave source of light at 532 nm. The light beam was then split between two arms of an interferometer, and the two arms were spatially overlapped at the recording medium. The power of the light in each beam was 2 mW, the beam diameters were 4 mm, and the two arms intersected at an angle of 44° (measured in air). Multiple holograms were written in a defined volume of each sample by rotating the sample with respect to the recording arms and recording holograms at different angular positions of the sample. In the majority of samples, 25 holograms were recorded by rotating the sample in 2° increments.

The recording times for each of the 25 holograms were optimized so that the holograms diffracted approximately equal amounts of light and so that the refractive index contrast of the material within the defined volume was fully developed. After the 25 holograms were recorded, the sample was placed in darkness for 20 minutes to allow any dark reactions to occur. They were then flood-cured using filtered visible light (450 nm<λ<650 nm) from a xenon arc lamp for 20–30 minutes. This post-exposure flood cure consumed any remaining photoactive species and rendered the recorded holograms permanent.

To measure the refractive index contrast of the samples, the diffraction efficiencies of each of the recorded holograms were measured. The intensity of the light diffracted from one of the beams used for recording was measured as the sample was rotated through each of the recording positions and was ratioed to the intensity of light incident on the sample. The M/# of the materials was calculated from the diffraction efficiencies of all the recorded holograms. M/# is the sum of the square-root of the diffraction efficiencies of all the holograms.

Hologram media that were not sealed according to the invention were found to degrade with time. After hermetic sealing, according to the invention, the effective shelf life improved substantially.

Various additional modifications of this invention will occur to those skilled in the art. All deviations from the specific teachings of this specification that basically rely on the principles and their equivalents through which the art has been advanced are properly considered within the scope of the invention as described and claimed.

We claim:

1. Method for storing optical data in the form of holograms, the method comprising the steps of:
   (a) directing a first laser beam onto a holographic medium at a first angle,
   (b) directing a second laser beam onto said holographic medium at a second angle different from said first angle,
   (c) rotating said holographic medium with respect to said first and second laser beams,
   the method characterized in that said holographic medium is a photosensitive polymer contained between two transparent plates, each having an edge portion and a center portion, and said medium is prepared by
   i. attaching a metal foil to each plate, said metal foil having an inner edge and an outer edge,
   ii. attaching the inner edge of said metal foil to the edge portion of each of said plates so that the outer edge of the metal foil extends away from the plate, iii. aligning said plates with a space therebetween, iv. filling said space with said photosensitive polymer, and v. sealing said plates together by bonding together the outer edges of the metal foil on said plates.

2. The method of claim 1 wherein the said metal foil is attached to said plates using an adhesive polymer with a glass transition temperature above 100° C.

3. The method of claim 1 wherein the said metal foil is attached to said plates using solder.

4. The method of claim 1 wherein the outer edges of the metal foil on said plates are bonded together using an adhesive polymer with a glass transition temperature above 100° C.

5. The method of claim 1 wherein the outer edges of the metal foil on said plates are bonded together using solder.

6. The method of claim 1 wherein said metal foil comprises a metal selected from the group consisting of Al, Cu, Au, Ag, Ta, Ti, and Pt.

7. The method of claim 1 wherein said plates are glass.

8. The method of claim 1 wherein said plates are plastic.

9. The method of claim 1 wherein the holographic medium has a thickness in the range 50–2000 μm.

10. The method of claim 1 wherein the plates are bonded together using mechanical crimping.

11. A method for preparing a holographic medium wherein said holographic medium is a photosensitive polymer contained between two transparent plates each having an edge portion and a center portion comprising the steps of:

a. attaching a metal foil to each plate, said metal foil having an inner edge and an outer edge, b. attaching the inner edge of said metal foil to the edge portion of each of said plates so that the outer edge of the metal foil extends away from the plate, c. aligning said plates with a space therebetween, d. filling said space with said photosensitive polymer, and e. sealing said plates together by bonding together the outer edges of the metal foil on said plates.

12. The method of claim 11 wherein the said metal foil is attached to said plates using an adhesive polymer with a glass transition temperature above 100° C.

13. The method of claim 11 wherein the said metal foil is attached to said plates using solder.

14. The method of claim 11 wherein the outer edges of the metal foil on said plates are bonded together using an adhesive polymer with a glass transition temperature above 100° C.

15. The method of claim 11 wherein the outer edges of the metal foil on said plates are bonded together using solder.

16. The method of claim 11 wherein said metal foil comprises a metal selected from the group consisting of Al, Cu, Au, Ag, Ta, Ti, and Pt.

17. The method of claim 11 wherein said plates are glass.

18. The method of claim 11 wherein said plates are plastic.

19. The method of claim 11 wherein the holographic medium has a thickness in the range 50–2000 μm.

20. The method of claim 11 wherein the plates are bonded together using mechanical crimping.

21. Holographic medium comprising:

a. a pair of transparent plates, each having an edge portion and a center portion, b. a metal foil attached to each plate, said metal foil having an inner edge and an outer edge, with the inner edge attached to the edge portion of each plate so that the outer edge of the metal foil extends away from the plate, c. means for aligning said plates with a space therebetween, d. a photosensitive polymer filling said space, and e. sealing means for sealing said plates together, said sealing means bonding together the outer edges of the metal foil on said plates.

22. The holographic medium of claim 21 wherein the said metal foil is attached to said plates using an adhesive polymer with a glass transition temperature above 100° C.

23. The holographic medium of claim 21 wherein the said metal foil is attached to said plates using solder.

24. The holographic medium of claim 21 wherein the outer edges of the metal foil on said plates are bonded together using an adhesive polymer with a glass transition temperature above 100° C.

25. The holographic medium of claim 21 wherein the outer edges of the metal foil on said plates are bonded together using solder.

26. The holographic medium of claim 21 wherein said metal foil comprises a metal selected from the group consisting of Al, Cu, Au, Ag, Ta, Ti, and Pt.

27. The holographic medium of claim 21 wherein said plates are glass.

28. The method of claim 21 wherein the plates are bonded together using mechanical crimping.

* * * * *